(No Model.)

E. O. WILSON.
FILTER FAUCET.

No. 505,340. Patented Sept. 19, 1893.

WITNESSES:
Chas. Nida
C. Sedgwick

INVENTOR
E. O. Wilson
BY Munn & Co
ATTORNEYS.

UNITED STATES PATENT OFFICE.

EDWARD O. WILSON, OF JERSEY CITY, NEW JERSEY.

FILTER-FAUCET.

SPECIFICATION forming part of Letters Patent No. 505,340, dated September 19, 1893.

Application filed March 9, 1893. Serial No. 465,300. (No model.)

*To all whom it may concern:*

Be it known that I, EDWARD O. WILSON, of Jersey City, in the county of Hudson and State of New Jersey, have invented a new and Improved Filter-Faucet, of which the following is a full, clear, and exact description.

The object of the invention is to provide a new and improved filter faucet, which is simple and durable in construction and arranged to thoroughly filter the liquid.

The invention consists of a faucet provided with a casing having perforated partitions forming filtering compartments and discharging into the faucet.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in both figures.

Figure 1:
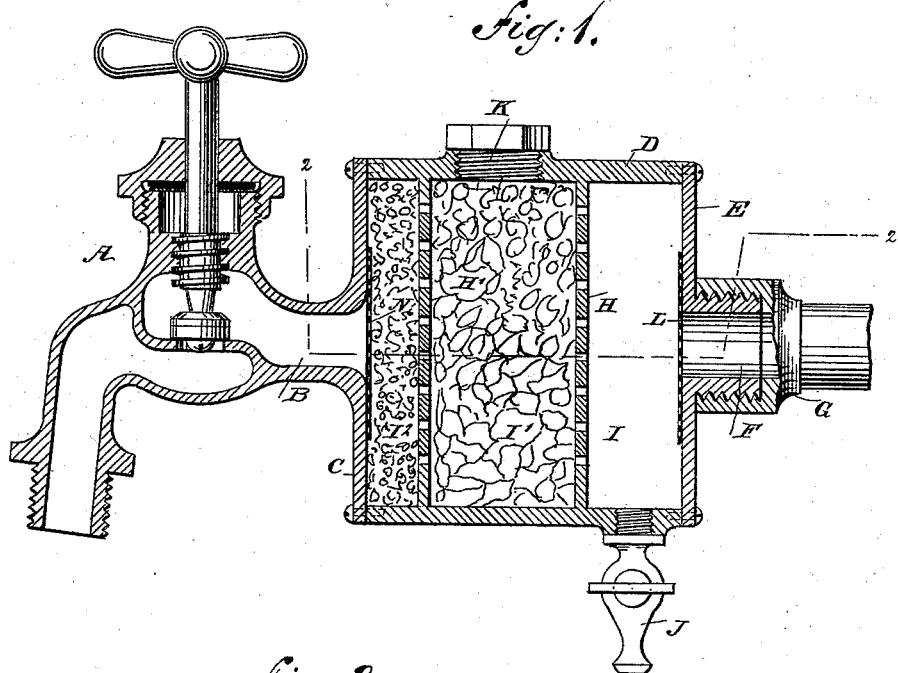
Figure 2:
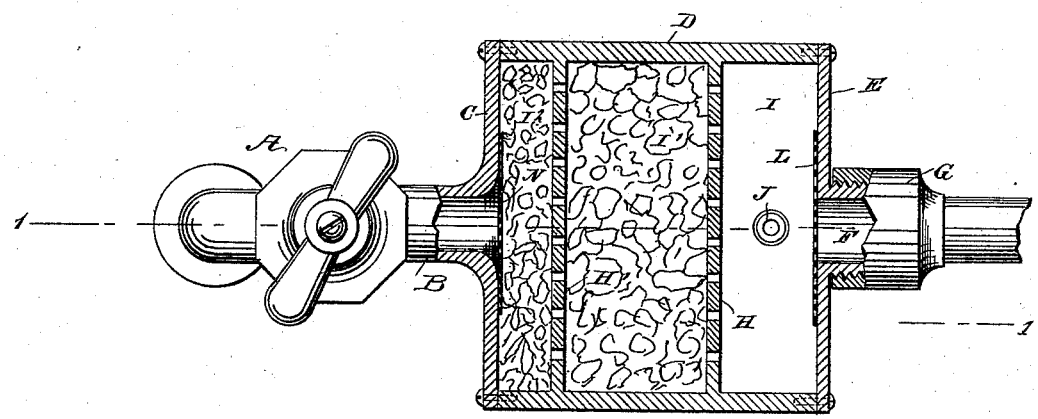

Figure 1 is a sectional side elevation of the improvement on the line 1—1 of Fig. 2; and Fig. 2 is a sectional plan view of the same on the line 2—2 of Fig. 1.

The improved filter faucet is provided with a faucet A, of any approved construction and formed at the rear end of its shank B with a plate C, forming the front cover for a casing D, provided with a rear cover E having an apertured offset F, on which screws the nipple G for making connection with the water supply pipe. The casing D is preferably formed integral with transverse, perforated partitions H and H' forming compartments I, I' and I², of which the compartment I is the receiving compartment into which discharges the water coming from the supply pipe through the nipple G and apertured offset F. In the bottom of this compartment I is arranged a drain cock J for draining the compartment to carry off mud and other impurities settling in the bottom of the compartment. The middle compartment I' is preferably filled with a suitable filtering material, such as charcoal, and in the top of the said compartment screws a cap or plug K for inserting or removing the filtering material. The front compartment I² opens into the shank B of the faucet A, through an aperture in the plate C, and is preferably filled with gravel.

On the inner faces of the covering plates E and C, are arranged screens L and N respectively, over the apertures in the said plates, to prevent the larger impurities from passing into the compartment I, and to prevent gravel held in the compartment I² from passing into the shank B of the faucet A. It will be seen that when the connection is made with the water supply, as described, and the valve in the faucet A is opened, then the liquid will flow through the filter casing D and faucet A to the vessel to be filled, the water in its passage through the several compartments of the casing becoming filtered, so as to pass in a purified state out of the faucet A.

It will be seen that the device is very simple and durable in construction, can be cheaply manufactured, and can be readily connected with the water supply pipe, without taking up much space or requiring change of the usual arrangements on sinks and other places in which such faucets are employed.

Having thus fully described my invention, I claim as new and desire to secure by Letters Patent—

1. As an improved article of manufacture a filter faucet, comprising a casing provided with transverse perforated partitions forming filtering compartments, a faucet connected with one end of the said casing, a water supply nipple connected with the opposite end of the casing, and screens secured to the end walls of the casing to cover the apertures leading to said faucet and said nipple the compartments of the casing being filled with a suitable filtering material, with the exception of the compartment adjacent to the water inlet, the said compartment being provided with a drain cock in its bottom, substantially as shown and described.

2. As an improved article of manufacture a filter faucet, comprising a casing open at both ends formed integral with transverse perforated partitions forming filtering compartments, a faucet formed integral with a cover plate adapted to close the said casing at one end, a water supply nipple carried by another cover plate adapted to close the casing at the opposite end the said cover plates being provided with screens covering the apertures leading to the faucet and to the water supply respectively, and a suitable filtering material located in the compartments of the casing with the exception of the compartment adjacent to the water inlet, the said compartment being provided with a drain cock in its bottom, substantially as shown and described.

EDWARD O. WILSON.

Witnesses:
   THEO. G. HOSTER,
   C. SEDGWICK.